United States Patent
Kanou et al.

(10) Patent No.: US 7,359,293 B2
(45) Date of Patent: Apr. 15, 2008

(54) OPTICAL PICKUP DEVICE

(75) Inventors: Yasuyuki Kanou, Gifu (JP); Shigeharu Shirane, Saitama (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 486 days.

(21) Appl. No.: 11/000,067

(22) Filed: Dec. 1, 2004

(65) Prior Publication Data

US 2005/0122854 A1    Jun. 9, 2005

(30) Foreign Application Priority Data

Dec. 5, 2003    (JP)    ............................. 2003-406786

(51) Int. Cl.
*G11B 7/09*    (2006.01)

(52) U.S. Cl. ............................... 369/44.15; 369/53.25; 369/44.23; 720/681

(58) Field of Classification Search ..................... None
See application file for complete search history.

(56) References Cited

FOREIGN PATENT DOCUMENTS

| JP | 10106012 A | * | 4/1998 |
| JP | 2003-77142 | | 3/2003 |
| JP | 2003115127 A | * | 4/2003 |
| JP | 2004014042 A | * | 1/2004 |

* cited by examiner

*Primary Examiner*—William Korzuch
*Assistant Examiner*—Jorge L. Ortiz-Criado
(74) *Attorney, Agent, or Firm*—Kratz, Quintos & Hanson, LLP (57) ABSTRACT

An optical pickup device is applied to DVD recorders and includes a beam expander unit. A drive coil wound around a lens holder within the beam expander unit, is located in a magnetic field formed by a magnet. When an electric current is passed through the drive coil, the drive coil moves an expander second lens in a direction of an optical axis, receiving a force based on interaction between the electric current and the magnetic field. This changes a distance between an expander first lens and the expander second lens, and thus light emitted from the beam expander unit toward an object lens becomes diffused light or converged light. Consequently, the objective lens generates a spherical aberration in a reverse direction of a spherical aberration that has occurred owing to a deviation of a cover layer in film thickness from a reference value, which cancels the latter spherical aberration.

7 Claims, 12 Drawing Sheets

OPTICAL PICKUP DEVICE

BACKGROUND OF THE INVENTION

1. Field of the Invention

The present invention relates to an optical pickup device. More specifically, the present invention relates to an optical pickup device for performing data recording/reproduction on an optical disk with a cover layer formed on a signal recording layer.

2. Description of the Prior Art

In recent years, an optical disk has been widely used as a medium for recording video data, audio data, computer data, etc. The need for an optical disk with high recording density and high capacity has been more and more increasing.

An optical disk has a cover layer through which light enters a signal recording layer. Recording/reproduction is carried out by irradiating the light to the signal recording layer through the cover layer. An object lens is designed in such a manner that, when a film thickness of the cover layer meets a reference value (standard value in the specification), a spherical aberration is a minimum on the signal recording layer. Thus, a spherical aberration occurs if the thickness of the cover layer differs from the reference value, for example, if a plurality of signal recording layers exist on one side of the optical disk, or if the cover layer exhibits manufacturing variations in film thickness.

According to the conventional optical pickup device disclosed in Japanese Patent Laying-open No. 2003-77142 (G11B 7/085), a beam expander composed of two convex lenses or one convex lens and one concave lens is located between a collimator lens and an object lens in order to correct such a spherical aberration that occurs due to a deviation of the cover layer in film thickness from the reference value. The beam expander changes a distance between the two lenses by driving one of the lenses with a stepping motor so as to adjust the emitted light in such a manner that it becomes converged light or diffused light. If the film thickness of the cover layer of the optical disk is small, for example, the beam expander lets converged light into the object lens. As a result, a spherical aberration due to the thin cover layer is cancelled by a spherical aberration that has occurred on the object lens, which causes almost no spherical aberration on the signal recording layer.

However, if the stepping motor for driving the lens in the beam expander is to be provided within an optical pickup device, there is a problem where the optical pickup device capable of correcting a spherical aberration becomes large in size.

SUMMARY OF THE INVENTION

It is therefore a primary object of the present invention is to provide a novel optical pickup device.

It is another object of the present invention is to provide an optical pickup device that is small in size and capable of correcting a spherical aberration.

It is still another object of the present invention is to provide an optical pickup device that allows a control system to be simplified.

According to claim 1, an optical pickup device for data recording/reproduction on an optical disk with a cover layer formed on a signal recording layer, comprises a light source, an object lens for focusing light from the light source onto the signal recording layer through the cover layer, a beam expander unit including a fixed portion and a movable portion, provided between the light source and the object lens, which converts light from the light source into any one of diffused light, converged light and collimated light and emits the light, and a moving means that moves the movable portion in a direction of an optical axis by passing an electrical current through a drive coil contained in the movable portion provided in a magnetic field.

In the present invention of claim 1, the drive coil in the movable portion of the beam expander unit is located within the magnetic field. Thus, when an electric current is passed through the drive coil, the drive coil moves the movable portion in the direction of the optical axis, receiving a force based on interaction between the electric current and the magnetic field. This changes a distance between two lenses contained in the beam expander unit, and the light emitted from the beam expander unit becomes diffused light or converged light. As a consequence, the object lens generates a spherical aberration in a reverse direction of a spherical aberration due to a deviation of the cover layer in film thickness from the reference value, thereby canceling the spherical aberration due to the deviation from the reference value. In this case, no stepping motor for moving the movable portion is required, which makes it possible to downsize the optical pickup device capable of correcting a spherical aberration.

Also, as compared to a case where the stepping motor is employed, there is no need for four or more signal lines for controlling the stepping motor and two to four signal lines for controlling a limit switch for the detection of position of a movable portion. All required signal lines are only two for controlling the drive coil. With this, the control system of the optical pickup device can be simplified.

An optical pickup device of claim 2 is dependent on claim 1. The drive coil is wound in a direction orthogonal to the direction of the optical axis. The magnet is positioned in the fixed portion so that a magnetic field may be generated in a direction orthogonal to both the direction of an electric current passed through the drive coil and the direction of the optical axis. In this case, when an electric current is passed through the drive coil, the drive coil receives a force in the direction of the optical axis based on interaction between the electric current and the magnetic field. When the drive coil has received the force, the movable portion moves in the direction of the optical axis, and the light incident onto the object lens becomes diffused light or converged light. As a consequence, it is possible to suppress the occurrence of a spherical aberration.

An optical pickup device of claim 3 is dependent claim 1 or 2. The beam expander unit further comprises a restoration means for restoring the movable portion to a position before having been moved by the drive coil. In this case, the movable portion that has been moved in the direction of the optical axis can be restored by the restoration means to the pre-movement position, which eliminates the need for providing the limit switch for detecting the position of the movable portion within the optical pickup device. This allows the optical pickup device to be made more compact.

An optical pickup device of claim 4 is dependent on claim 3. The restoration means includes two spiral leaf springs that make no contact with each other. The two spiral leaf springs are electrically connected with the both ends of the drive coil, respectively. In this case, the movable portion is restored by the two spiral leaf springs to the pre-movement position. Making the leaf springs spiral decreases a load in the movement direction, which improves the movable portion in sensitivity. Additionally, since the two spiral leafs do not touch with each other, it is possible to electrically connect the both ends of the drive coil wound around the movable portion to the two spiral leaf springs, respectively, and supply an electric current to the drive coil via the spiral leaf springs.

An optical pickup device of claim 5 is dependent on any one of claims 1 to 4, and further comprises a collimator lens provided between the light source and the beam expander unit, which converts light from the light source into collimated light. In this case, the light from the light source is converted by the collimator lens into collimated light and is entered into the beam expander unit. This makes it easy to make adjustments for converting the incident light into diffused light, converged light or collimated light.

An optical disk recording/reproduction apparatus of claim 6 includes an optical pickup device according to one of claim 1 to 5, and further comprises a temperature sensor for measuring an ambient temperature of the light source, and a first control means for controlling the moving means based on a result measured by the temperature sensor. In this case, a wavelength of light from the light source varies depending on the ambient temperature of the light source. In addition, as a refractive index changes according to the fluctuations of the light wavelength, the virtual film thickness of the cover layer varies, resulting in a spherical aberration. Therefore, the first control means controls the moving means in such a manner as to move the movable portion of the beam expander unit along the optical axis, based on the ambient temperature of the light source measured by the temperature sensor, thereby suppressing the occurrence of a spherical aberration.

An optical disk recording/reproduction apparatus of claim 7 is depending on claim 5, and further comprises an output sensor for measuring output of the light source, and a second control means for controlling the moving means based on a result measured by the output sensor. In this case, as the output of the light source changes, the wavelength of light emitted from the light source varies as well. Also, as a refractive index changes according to the fluctuations of light wavelength, the virtual film thickness of the cover layer varies, resulting in a spherical aberration. Therefore, the second control means controls the moving means in such a manner as to move the movable portion along the optical axis, based on the output of the light source measured by the output sensor, thereby suppressing the occurrence of a spherical aberration.

An optical disk recording/reproduction apparatus of claim 8 is depending on claim 6 or 7, and further comprises a detection means for detecting a position of the object lens along the optical axis, and a third control means for controlling the moving means based on a result detected by the detection means. In this case, the detection means firstly obtains the position of the object lens along the optical axis. Next, the third control means controls the moving means based on the obtained position of the object lens. As a result, the movable portion moves along the optical axis, suppressing the occurrence of a spherical aberration.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
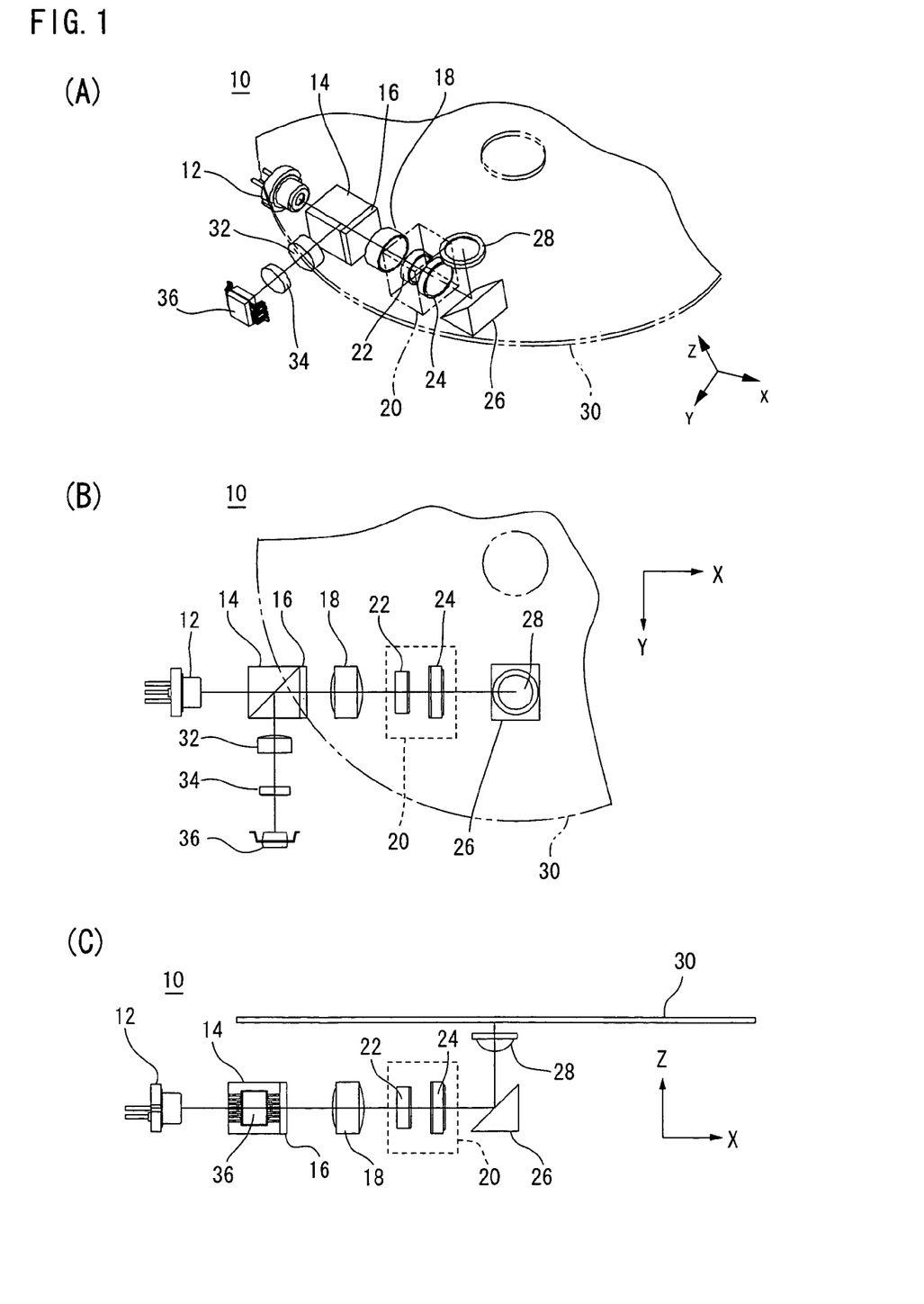
FIG. 1(A) is a perspective view of an optical pickup device of one embodiment of the present invention.
FIG. 1(B) is a front view of the optical pickup device shown in FIG. 1(A).
FIG. 1(C) is a side view of the optical pickup device shown in FIG. 1 (A).
Figure 2:
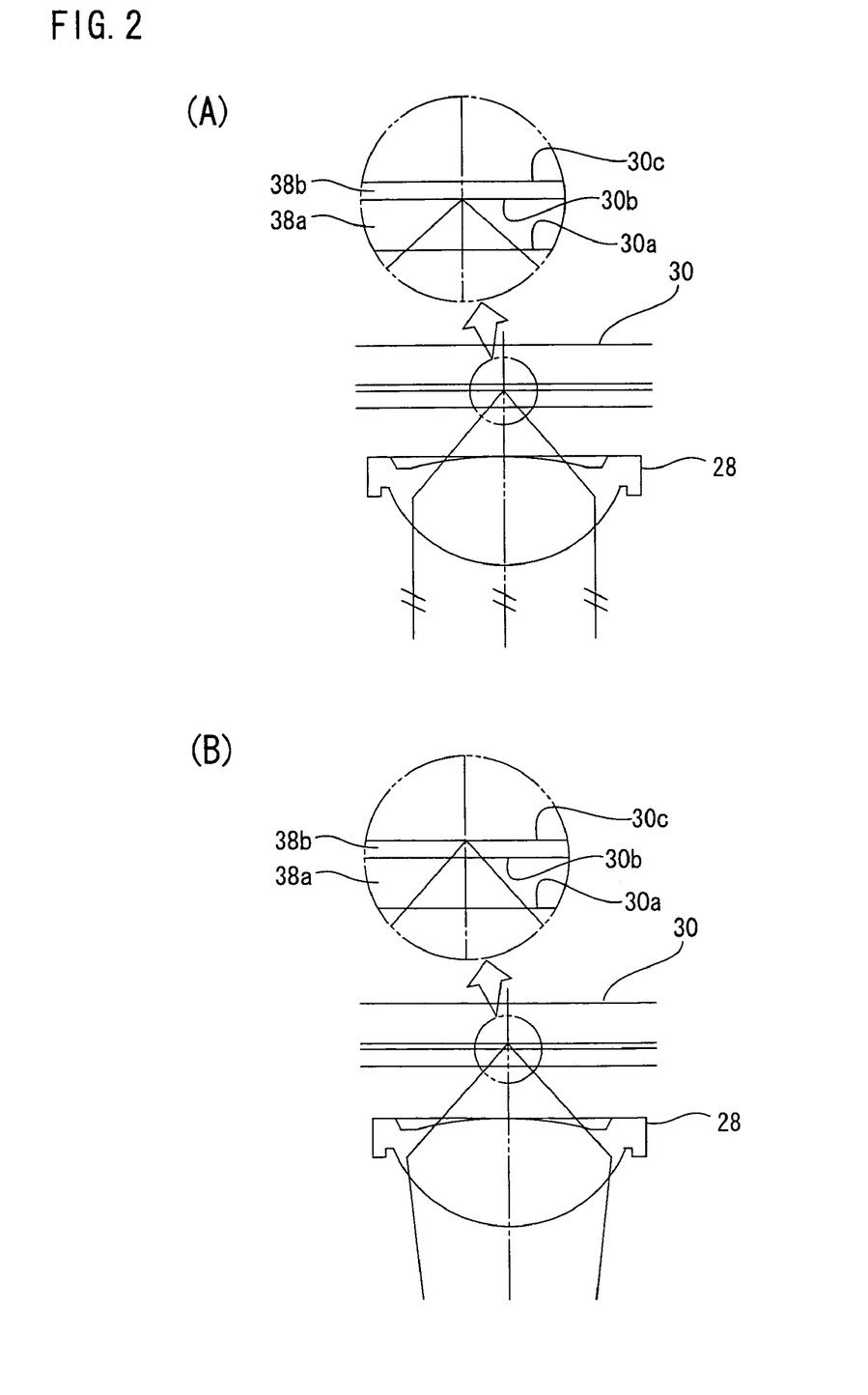
FIG. 2(A) is a sectional view showing a relationship between light emitted from an object lens of the optical pickup device shown in FIG. 1(A) and a first signal recording layer of the optical disk.
FIG. 2(B) is another sectional view showing a relationship between the light emitted from the object lens of the optical pickup device shown in FIG. 1(A) and the first signal recording layer of the optical disk.
Figure 3:
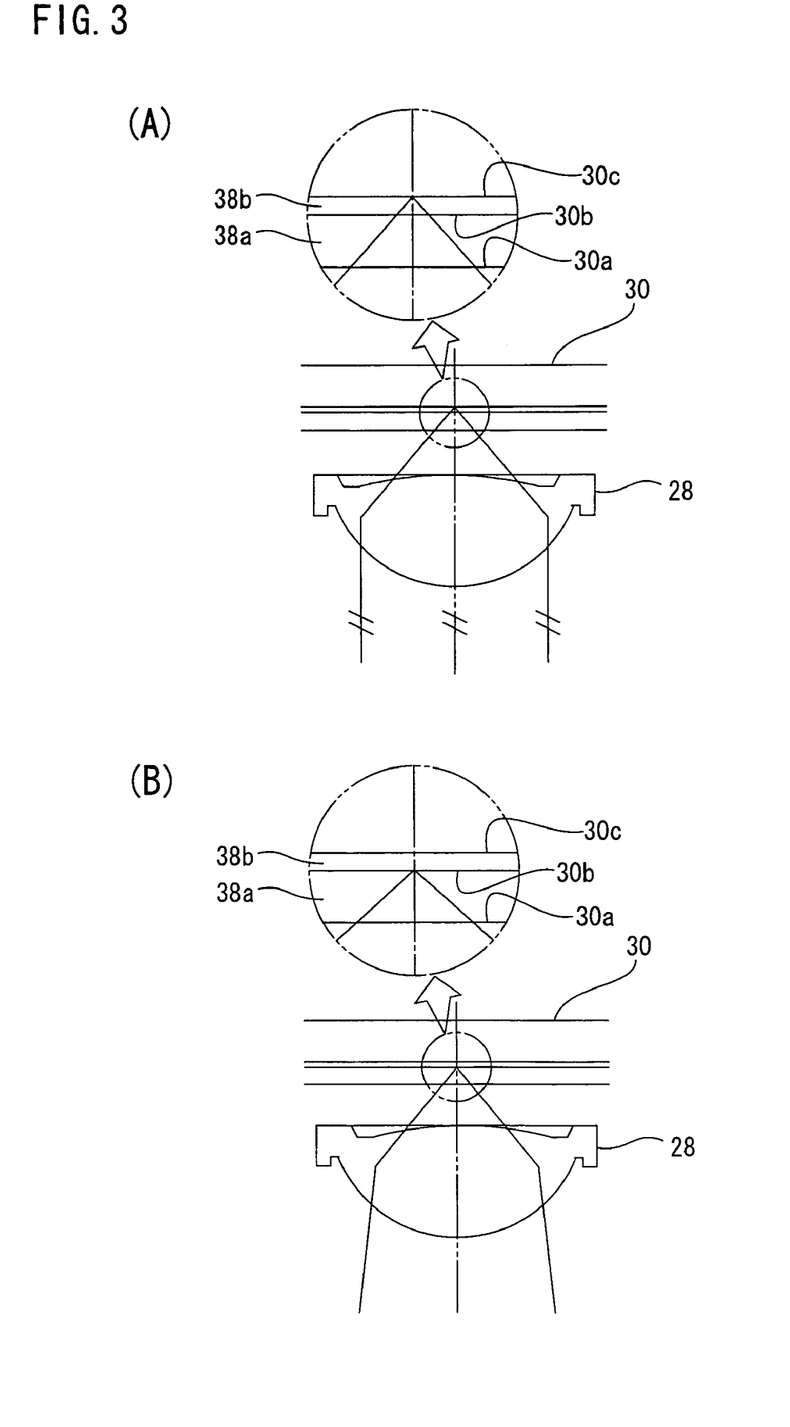
FIG. 3(A) is a sectional view showing a relationship between the light emitted from the object lens of the optical pickup device shown in FIG. 1(A) and a second signal recording layer of the optical disk.
FIG. 3(B) is another sectional view showing a relationship between the light emitted from the object lens of the optical pickup device shown in FIG. 1(A) and the second signal recording layer of the optical disk.
Figure 4:
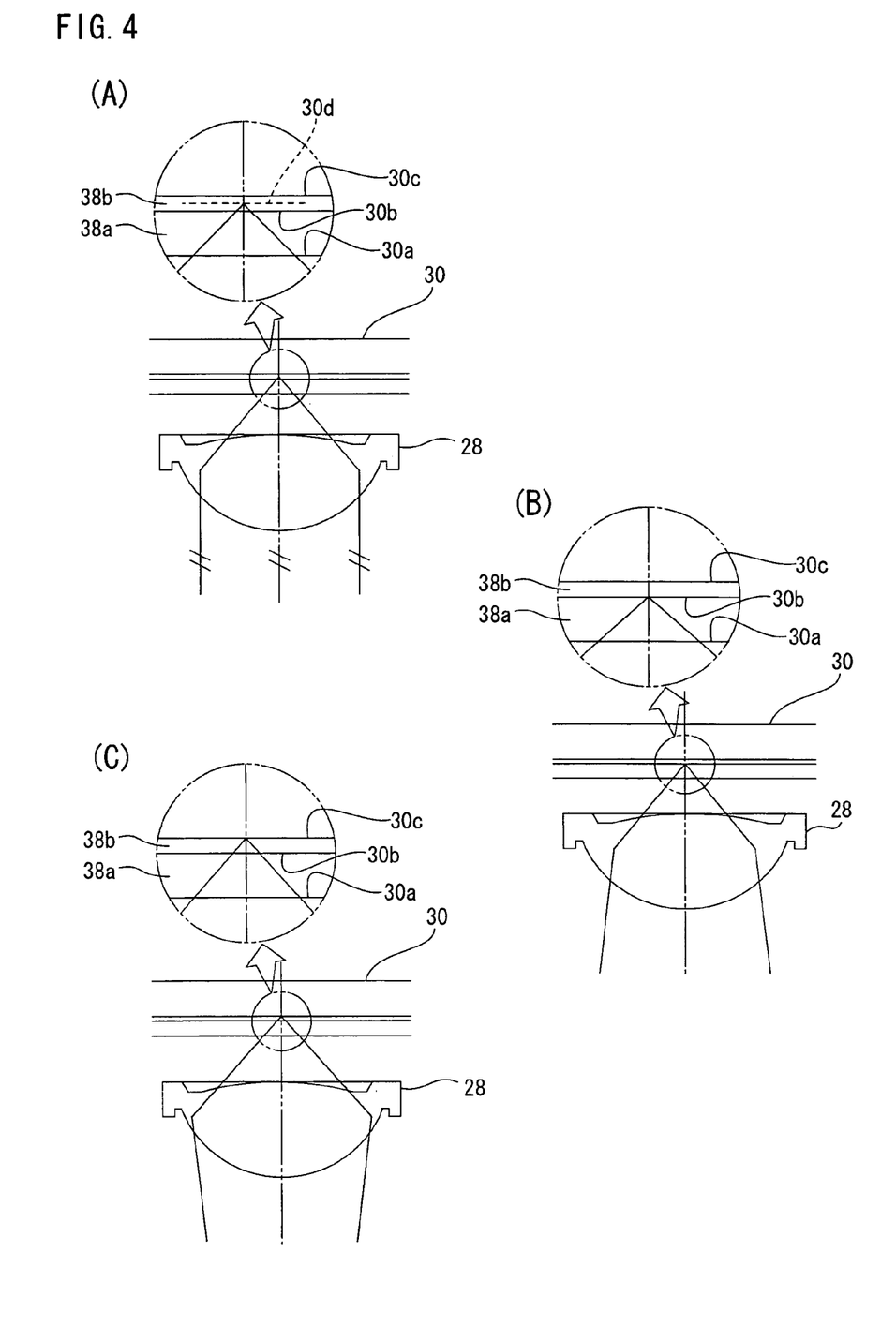
FIG. 4(A) is a sectional view showing a relationship between the light emitted from the object lens of the optical pickup device shown in FIG. 1(A) and the first signal recording layer and second signal recording layer of the optical disk.
FIG. 4(B) is another sectional view showing a relationship between the light emitted from the object lens of the optical pickup device shown in FIG. 1(A) and the first signal recording layer and second signal recording layer of the optical disk.
FIG. 4(C) is a further sectional view showing a relationship between the light emitted from the object lens of the optical pickup device shown in FIG. 1(A) and the first signal recording layer and second signal recording layer of the optical disk.

Referring to FIG. 1(A) to FIG. 1(C), an explanation will be given below regarding an optical pickup device 10 of an embodiment of the present invention. FIG. 1(A) to FIG. 1(C) show a perspective view, plan view and side view of the optical pickup device 10, respectively.

The optical pickup device 10 includes a semiconductor laser 12 as a light source. A laser beam of linearly polarized light emitted from the semiconductor laser 12 passes through a polarization beam splitter 14 and then is converted into circularly polarized light by a ¼ wavelength plate 16.

The laser beam converted into circularly polarized light is collimated by a collimator lens 18 and enters a beam expander unit 20. The beam expander unit 20 includes an expander first lens 22 as concave lens and an expander second lens 24 as convex lens. The expander second lens 24 moves in an X direction along an optical axis of the laser beam. The detailed structure of the beam expander unit 20 will be described later.

After passing through the beam expander unit 20, the laser beam is reflected by a 45-degree reflecting mirror 26 in a +Z direction toward which the object lens 28 is located, and is focused by the object lens 28 onto a signal recording layer of an optical disk 30.

The laser beam of circularly polarized light reflected by the signal recording layer, passes through the object lens 28 and is reflected by the 45-degree reflecting mirror 26. The reflected laser beam passes through the beam expander unit 20 and the collimator lens 18, and is converted by the ¼ wavelength plate 16 into a laser beam of linearly polarized light. The converted laser beam of linear polarization is rotated 90 degrees with respect to a direction of polarization immediately after it has been emitted from the semiconductor laser 12. The laser beam converted into the linearly polarized light is reflected by the polarization beam splitter 12 in a +Y direction forming an angle of 90 degrees with respect to the incident direction.

The reflected light passes through a condensing lens 32 and a cylindrical lens 34 that causes astigmatism so as to control a focus servo, and enters a photodetector 36. The photodetector 36 includes a photodiode and outputs a signal corresponding to the strength of the incident light.

In reference to FIG. 2(A) to FIG. 4(C), an explanation will be provided below as to a relationship between a spherical aberration resulting from a deviation of a cover layer of the optical disk 30 from a reference value in film thickness and the light incident on the object lens 28.

Firstly, referring to FIG. 2(A), a description will be given regarding a case where the object lens 28 is designed so as to focus the collimated incident light onto a first signal recording layer 30b near a disk surface 30a. In such a case, when the collimated light enters the object lens 28, the spherical aberration of the light focused onto the first signal recording layer 30b becomes minimized.

In order to focus the collimated incident light by using the object lens 28 onto a second signal recording layer 30c located in a deeper position than the first signal recording layer 30b, it is necessary to let the incident light pass through not only a cover layer 38a but a cover layer 38b as well. Consequently, there occurs a spherical aberration in the light focused onto the second signal recording layer 30c. With that, as shown in FIG. 2(B), if the diffused light enters the object lens 28, there occurs a spherical aberration in the light emitted from the object lens 28 that cancels the above-mentioned spherical aberration almost completely. This makes it possible to suppress a spherical aberration of the light focused on the second signal recording layer 30c.

Next, referring to FIG. 3(A), an explanation will be provided below as to a case where the object lens 28 is designed so as to focus the collimated incident light onto the second signal recording layer 30c distant from the disk surface 30a. In such a case, when the collimated light enters the object lens 28, the spherical aberration of the light focused onto the second signal recording layer 30c becomes minimized.

If the collimated incident light is focused by using the object lens 28 onto the first signal recording layer 30b located in a shallower position than the second signal recording layer 30c, the incident light passes through only the cover layer 38a. Consequently, there occurs a spherical aberration in the light focused onto the first signal recording layer 30b. With that, as shown in FIG. 3(B), if the diffused light enters the object lens 28, there occurs a spherical aberration in the light emitted from the object lens 28 that cancels the above-mentioned spherical aberration almost completely. This makes it possible to suppress a spherical aberration of the light focused on the first signal recording layer 30b.

Additionally, in reference to FIG. 4(A), a description will be presented below regarding a case where the object lens 28 is designed so as to focus the collimated incident light onto a middle position 30d of the cover layer 38b sandwiched between the first signal recording layer 30b and the second signal recording layer 30c. In such a case, when the collimated light enters the object lens 28, the spherical aberration of the light focused onto the middle position 30d of the cover layer 38b becomes minimized.

If the collimated incident light is focused by use of the object lens 28 onto the first signal recording layer 30b located in a shallower position than the middle position 30d of the cover layer 38b, the incident light passes through only the cover layer 38a. Consequently, there occurs a spherical aberration on the first signal recording layer 30b. With that, as shown in FIG. 4(B), if the converged light enters the object lens 28, there occurs a spherical aberration in the light emitted from the object lens 28 that cancels the above-mentioned spherical aberration almost completely. This makes it possible to suppress a spherical aberration in the light focused on the first signal recording layer 30b.

In order to focus the collimated incident light by using the object lens 28 onto the second signal recording layer 30c located in a deeper position than the middle position 30d of the cover layer 38b, it is necessary to let the incident light pass through not only the cover layer 38a but the cover layer 38b as well. Consequently, there occurs a spherical aberration in the light focused onto the second signal recording layer 30c. With that, as shown in FIG. 4(C), if the diffused light enters the object lens 28, there occurs a spherical aberration in the light emitted from the object lens 28 that cancels the above-mentioned spherical aberration almost completely. This makes it possible to suppress a spherical aberration of the light focused on the second signal recording layer 30c.

As can be seen from the above explanations, it is possible to suppress a spherical aberration of the light focused onto the first signal recording layer 30b or the second signal recording layer 30c by converging or diffusing the light incident on the object lens 28.

Incidentally, in a case where the cover layers 38a and 38b of the optical disk 30 deviate from the reference value in film thickness due to manufacturing variations in film thickness of the optical disk 30, a spherical aberration can be also suppressed in the same way.

Moreover, if there is any change in the output of the semiconductor laser 12 as a light source and the ambient temperature of the same, etc., the wavelength of laser beam also varies slightly with that. At this time, there are some fluctuations in the refractive indexes of the cover layers 38a and 38b corresponding to the wavelength of laser beam, which lead to variations in the virtual film thicknesses of the cover layers 38a and 38b. This induces a spherical aberration. In this case as well, the spherical aberration can be suppressed in the same way as mentioned above.

Next, referring to FIG. 5, it will be explained below that the light incident on the object lens 28 can be converted into collimated light, diffused light or converged light by changing the distance between two lenses contained in the beam expander unit 20.

In this embodiment, the expander first lens 22 (on the side of the collimator lens 18) is taken as a concave lens and the expander second lens 24 (on the side of the object lens 28) as a convex lens. The semiconductor laser (light source) 12, the collimator lens 18, the expander first lens 22, and the object lens 28 are fixed in their respective positions. Only the expander second lens 24 can move in the direction of the optical axis. Also, "a" denotes a focal length of the object lens 28 on an emitting side (rear-side focal length) and "b" indicates a focal length of the object lens 28 on an incidence side (front-side focal length).

Figure 5:
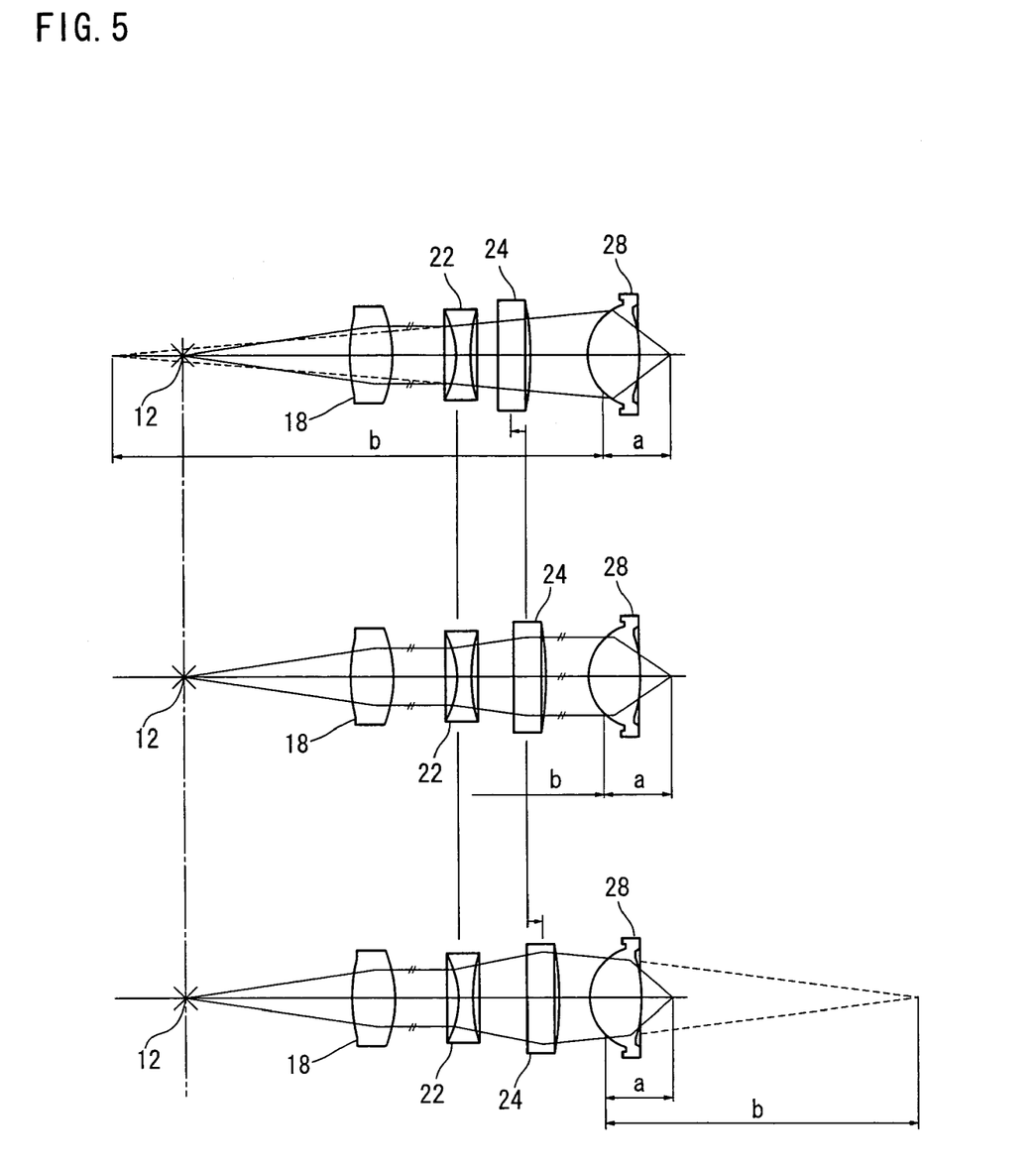
FIG. 5 is an illustrative view showing a relationship between a position of an expander second lens of the optical pickup device shown in FIG. 1(A) and light incident on the object lens.

A middle drawing in FIG. 5 indicates that the film thickness of the cover layer of the optical disk 30 meets the reference value. At this time, the distance between the expander first lens 22 and the expander second lens 24 is a distance at which the collimated light emitted from the collimator lens 18 is diffused by the expander first lens 22 and is collimated again by the expander second lens 24. Thus, the light emitted from the expander second lens 24 is collimated light.

An upper drawing in FIG. 5 indicates that the film thickness of the cover layer of the optical disk 30 is larger than the reference value. At this time, the expander second lens 24 has moved nearer to the light source 12 as compared to the case of the middle drawing, so the light emitted from the expander second lens 24 is diffused light.

A lower drawing in FIG. 5 indicates that the film thickness of the cover layer of the optical disk 30 is smaller than the reference value. At this time, the expander second lens 24 has moved nearer to the object lens 28 as compared to the case of the middle drawing, so the light emitted from the expander second lens 24 is converged light.

Figure 6:
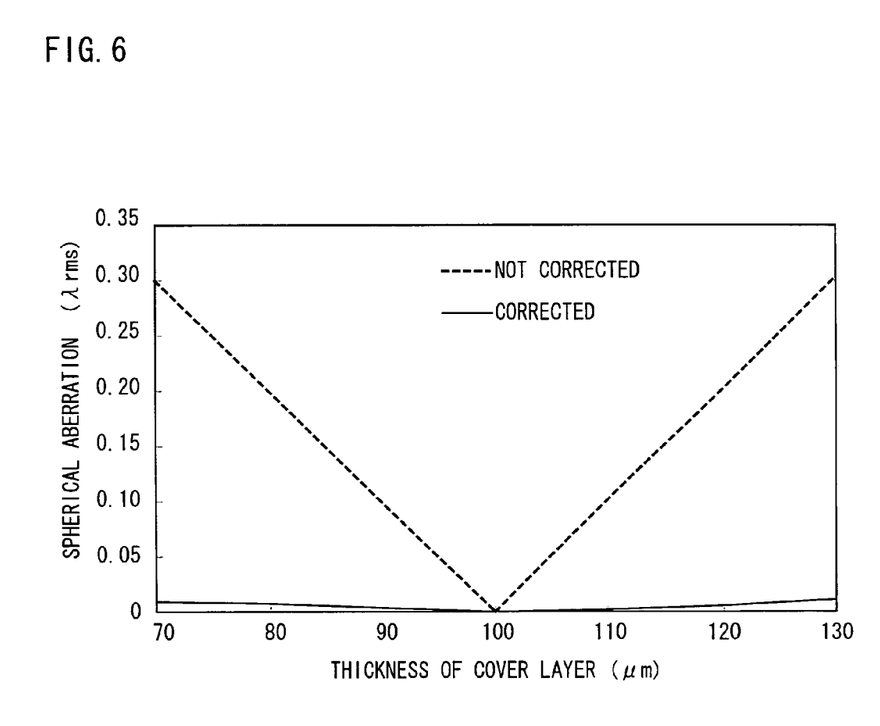
FIG. 6 is a graph indicating an effect of correction made by the optical pickup device shown in FIG. 1(A).

Referring to FIG. 6, an explanation will be given below about a spherical aberration that occurs if the film thickness of the cover layer of the optical disk 30 has changed within a range from 70 µm to 130 µm, and about a result on a simulation of correction made to this spherical aberration. Here, the reference value of the film thickness of the cover layer is 100 µm, and a numerical opening NA of the object lens is 0.85.

For example, if the film thickness of the cover layer deviates by ±25 µm from the reference value of 100 µm, that is, if the film thickness of the cover layer is 125 µm or 75 µm, as can be seen from FIG. 6, the amount of a spherical aberration increases up to about 0.25 λ ("λ" denotes the wavelength of light). To achieve favorable recording/reproduction characteristics, it is generally said that the amount of the spherical aberration generated by the optical pickup device 10 must be held at 0.07 λ or less. Accordingly, if the amount of the spherical aberration is 0.25 λ, no favorable recording/reproduction characteristics can be obtained.

Thus, it becomes possible to keep the amount of spherical aberration at 0.01 λ or less that hardly affects the recording/reproduction characteristics of the optical pickup device 10 by moving the expander second lens 24 in the direction of the optical axis and entering diffused light or converged light into the object lens 28.

Figure 7:
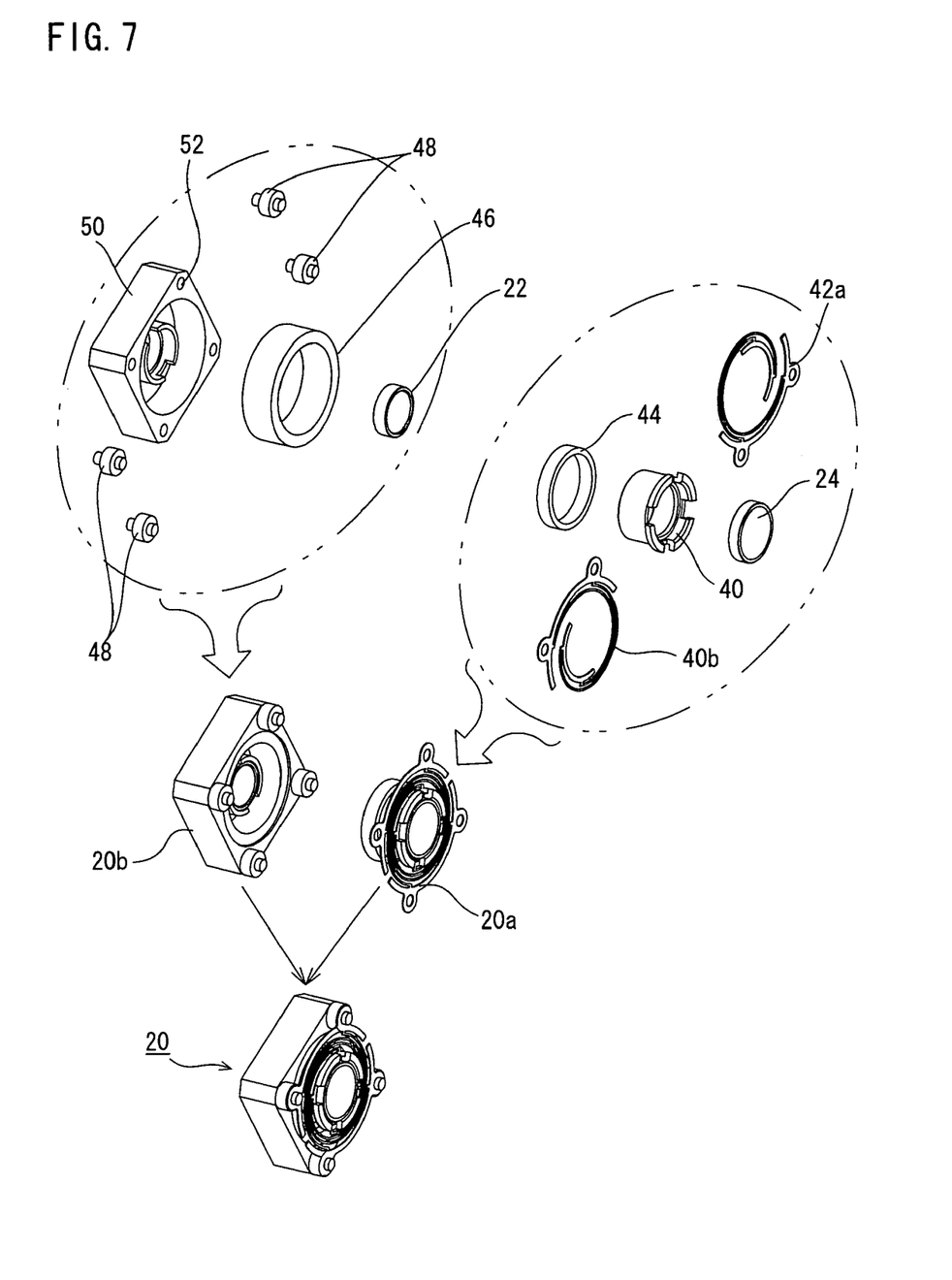
FIG. 7 is an illustrative view showing a structure of a beam expander unit of the optical pickup device shown in FIG. 1(A).

Next, referring to FIG. 7, a description will be provided below on the structure of the beam expander unit 20. The beam expander unit 20 includes a movable portion 20a and a fixed portion 20b. The movable portion 20a includes a lens holder 40 with the expander second lens 24 fixed as a convex lens, the drive coil 44 wound around the outer periphery of the lens holder 40 in such a manner as to be orthogonal to the optical axis, and the two spiral leaf springs 46a and 46b. One end of the lens holder 40 has the drive coil 44 wound around it, and the other end has a protrusion whose diameter is larger than the one end and is divided into quarters by notches. The both ends of the drive coil 44 are electrically connected to the spiral leaf springs 42a and 42b, respectively. Details on the method of combining the spiral leaf springs 42a and 42b will be described later.

The fixed portion 20b includes a yoke 50. A ring-shaped magnet 46 is positioned on an inner wall of an opening formed in the yoke 50, and the expander first lens 22 is fixed to the middle of the opening of the yoke 50. The lens holder 40 of the movable portion 20a is stored in space between the magnet 46 and the expander first lens 22 in such a manner as to be movable in the direction of the optical axis. The yoke 50 constitutes a magnetic circuit together with the magnet 46, and performs a function of increasing the strength of a magnetic field generated by the magnet 46.

The yoke 50 is insulated from the spiral leaf springs 42a and 42b by a spacer 48 consisted of an insulating material. The spacer 48 is cylindrical in form, and the diameters of its both ends are smaller than the diameter of the middle part thereof. One of the ends is inserted into a hole 52, and the other end is inserted into a hole formed in the spiral leaf springs 42a and 42b at two positions each. Consequently, the yoke 50 is insulated from the spiral leaf springs 42a and 42b by the middle part of the spacer 48. The method of fixing the spiral leaf springs 42a and 42b to the fixed portion 20b will be described later in detail.

If the magnet 46 is ring-shaped, it is possible to reduce components in number. However, there is a problem where it is difficult to manufacture the magnet 46 due to its small size. On this account, the magnet 46 may be arranged on the inner wall of the opening in a form divided into a plurality of parts, so that it takes on a fan shape as viewed from the direction of the optical axis.

Figure 8:
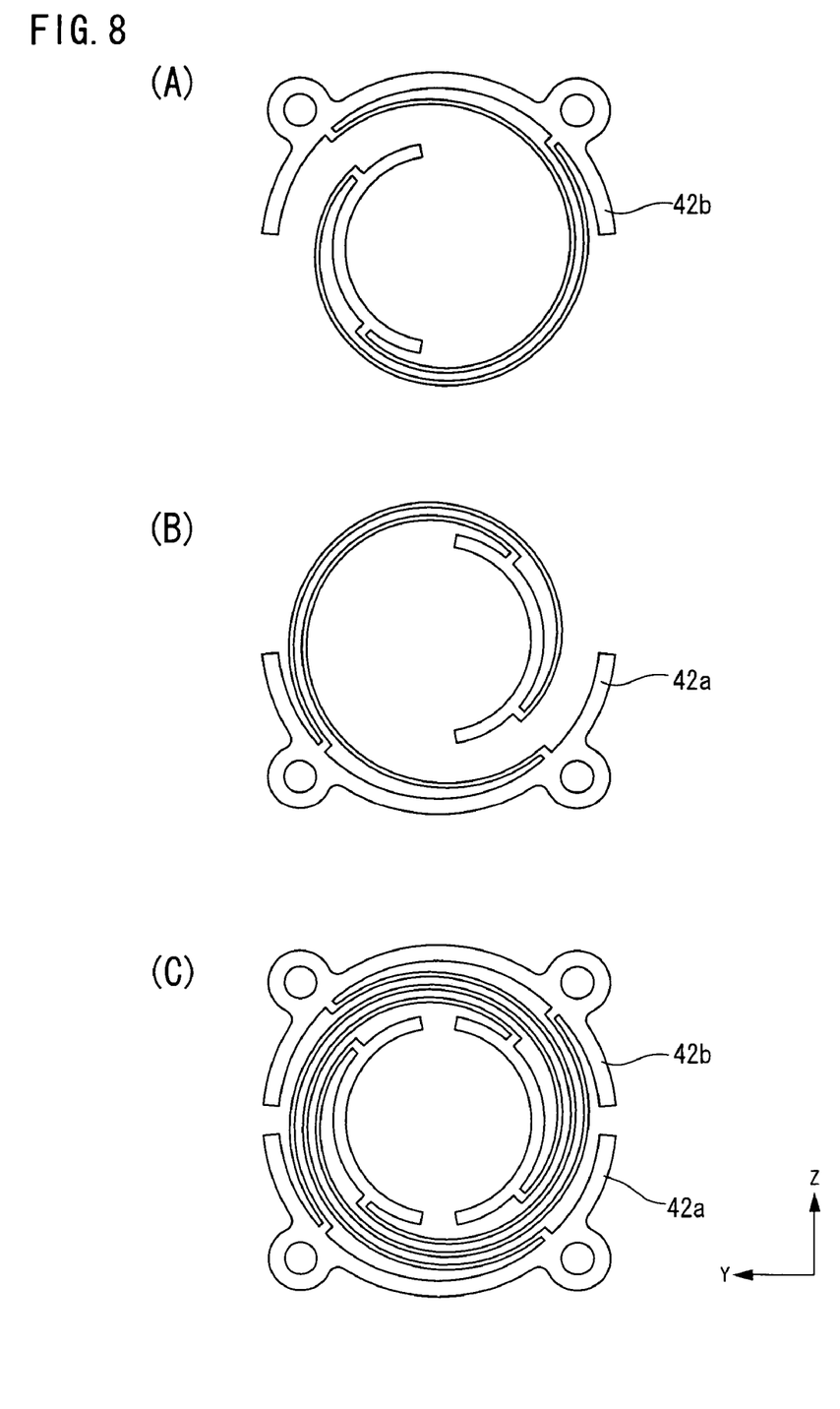
FIG. 8(A) is an illustrative view showing one of spiral leaf springs of the optical pickup device shown in FIG. 1(A).
FIG. 8(B) is an illustrative view showing the other spiral leaf spring of the optical pickup device shown in FIG. 1(A).
FIG. 8(C) is an illustrative view showing a state where the spiral leaf spring shown in FIG. 8(A) and the spiral leaf spring shown in FIG. 8(B) are combined with each other.

Referring to FIG. 8(A) to FIG. 8(C), a description will be provided below on the forms of the spiral leaf springs 42a and 42b and the method of combining them. As can be seen from FIG. 8(A), the spiral leaf spring 42b has four circular arcs of different lengths arranged in a swirling manner with space wider than the width of the arc between them. These arcs are connected not so as to separate from each other. The arc on the outermost perimeter has two holes. When the other end of the spacer 48 is inserted into the hole, the spiral leaf spring 42b is fixed to the fixed portion 20b of the beam expander 20.

As is apparent from FIG. 8(B), the spiral leaf spring 42a is of identical shape with the spiral leaf spring 42b. Therefore, as shown in FIG. 8(C), when the spiral leaf spring 42a and the spiral leaf spring 42b are combined with a rotation of 180 degrees from each other on the same plane, each of the arcs of the spiral leaf spring 42a is positioned between the arcs of the spiral leaf spring 42b. In this way, since the spiral leaf springs 42a and 42b are combined without contact between them, it is possible to supply an electric current to the drive coil 44 via the spiral leaf springs 42a and 42b.

Figure 9:
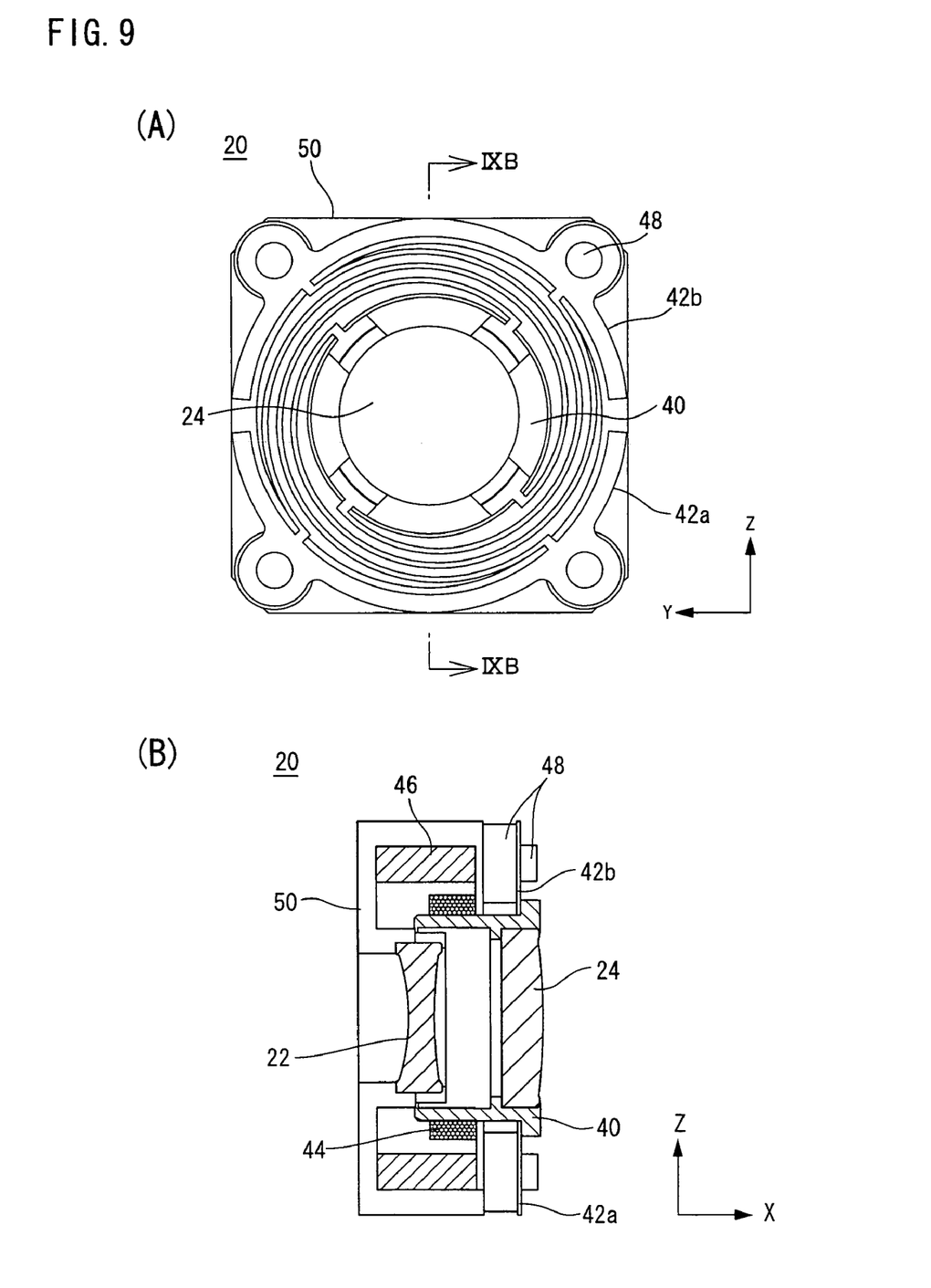
FIG. 9(A) is a plane view showing the spiral leaf springs in the beam expander shown in FIG. 7.
FIG. 9(B) is a sectional view taken along a line IXB-IXB shown in FIG. 9(A).

Referring to FIG. 9(A) and FIG. 9(B), the structure of the beam expander unit 20 will be described below in more detail. FIG. 9(A) is an illustrated view of the beam expander unit 20 as seen from the +X direction (the direction perpendicular to the surface of paper sheet bearing FIG. 9 from the front side toward the back side). The arcs on the outermost periphery of the spiral leaf springs 42a and 42b are fixed to the yoke 50 by the spacer 48. The arcs on the innermost periphery are fixed with an adhesive to a YZ surface located at the base of the protrusion formed in the lens holder 40. Incidentally, in FIG. 9(A), some parts of the arcs on the innermost periphery can be seen through the four notches of the lens holder 40.

In this way, the spiral leaf springs 42a and 42b are spiral springs in which one end is fixed to the yoke 50 of the fixed portion 20b and the other end to the lens holder 40 of the movable portion 20a. This makes it possible to move the movable portion 20a in the direction of the optical axis, without having to apply a strong force to the movable portion 20a. As a consequence, the movable portion 20a can be improved in sensitivity. In this case, the movable portion 20a of the optical pickup device 10 can be shifted by up to ±1 mm in the direction of the optical axis from a state where no force is applied to it. Additionally, a spherical aberration due to deviations of the cover layers in film thickness from the reference value can be cancelled by moving the movable portion 20a by ±0.6 mm to 0.7 mm in the direction of the optical axis. As a consequence, the use of the spiral leaf springs 42a and 42b makes it possible to cancel the spherical aberration due to deviations of the cover layers in film thickness from the reference value.

In addition, if the power switch is suddenly turned off because of a power failure etc., the movable portion 20a is restored to the original point by the restoring force of the spiral leaf springs 42a and 42b. Thus, it is unnecessary to provide a limit switch for detecting the position of the movable portion 20a when the power switch has been turned on again afterward. This allows the optical pickup device 10 to be more miniaturized.

Moreover, FIG. 9(B) is a sectional view of the beam expander unit 20 taken along a line IXB-IXB as seen from the +Y direction. As is apparent from FIG. 9(B), the lens holder 40 is mounted in such a manner as to be movable within the yoke 50 in the X direction (the direction of the optical axis). The expander second lens 24 is fixed into the lens holder 40, and the drive coil 44 is wound around the outer periphery of the lens holder 40. Also, the expander first lens 22 is fixed to the center of the opening of the yoke 50, and the magnet 46 is located on the inner wall of the opening so as to surround the expander first lens 22.

Figure 10:
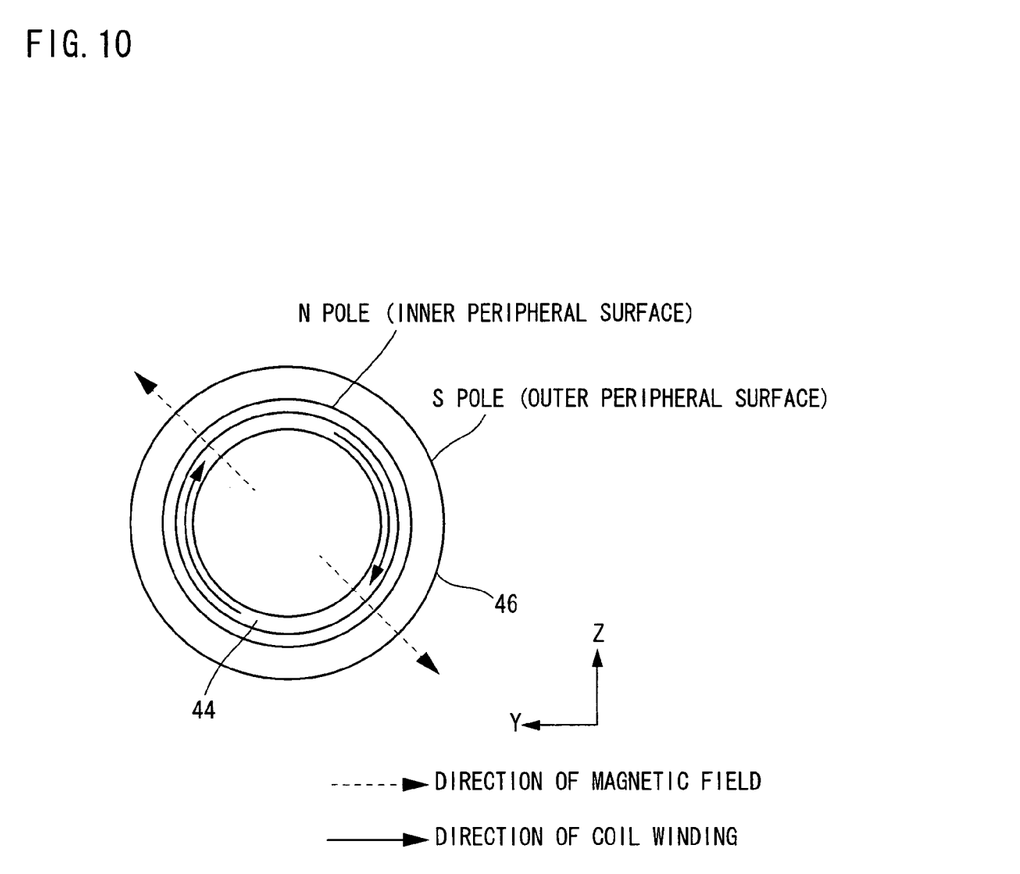
FIG. 10 is an illustrative view showing a principle of operation of the optical pickup device shown in FIG. 1(A).

With reference to FIG. 10, a driving principle of the beam expander unit 20 will be described below. The magnet 46 is positioned in such a manner as to surround the drive coil 44 of the movable portion 20a. When the inner wall of the magnet 46 is at the N Pole and the outer wall of the same is at the S Pole, the direction of a magnetic field generated by the magnet 46 is a direction radiating out from the center of the magnet 46 in the YZ plane. In addition, the drive coil 44 is wound around the optical axis in the direction orthogonal to the optical axis.

When a clockwise electric current is passed through the drive coil 44, a force is exerted on the drive coil 44 in the +X direction perpendicular both to the direction of the current and the direction of the magnetic field (direction perpendicular to the surface of paper sheet bearing FIG. 10 from the back side toward the front side) according to Fleming's left-hand rule. As a result, the distance between the expander second lens 24 and the expander first lens 22 is longer, and the light emitted from the expander second lens 24 is converged light.

On the other hand, when a counter-clockwise electric current is passed through the drive coil 44, a force is exerted on the drive coil 44 in the −X direction perpendicular both to the direction of the current and the direction of the magnetic field (direction perpendicular to the surface of paper sheet bearing FIG. 10 from the front side toward the back side) according to Fleming's left-hand rule. As a result, the distance between the expander second lens 24 and the expander first lens 22 become shorter, and the light emitted from the expander second lens 24 is diffused light.

The spherical aberration on the first signal recording layer 30b or second signal recording layer 30c of the optical disk 30 can be suppressed in the following way. A clockwise current or counter-clockwise current is passed through the drive coil 44 to move the movable portion 20a in the +X direction or the −X direction. In other words, the drive coil 44 is positioned within the movable portion 20a of the beam expander unit 20, and the movable portion 20a is moved in the direction of the optical axis by mutual interaction between the current passed through the drive coil 44 and the magnetic field, which leads to a change in the distance between the expander second lens 24 and the expander first lens 22. As a consequence, a spherical aberration is generated and makes it possible to cancel the spherical aberration that has occurred on the first signal recording layer 30b or the second signal recording layer 30c. Therefore, since there is no need to provide a stepping motor for moving the movable portion 20a within the optical pickup device 10, the optical pickup device 10 can be made smaller in size.

Furthermore, if no stepping motor is used, it becomes unnecessary to have four or more signal lines for controlling the stepping motor and two to four signal lines for controlling the limit switch for the detection of the position of the movable portion 20a. All newly required signal lines are only two ones for controlling the drive coil 44, which allows the control system to be simplified.

Although the expander first lens 22 is taken as a concave lens and the expander second lens 24 as a convex lens in the optical pickup device 10, the expander first lens 22 may be a convex lens and the expander second lens 24 a concave lens instead. Alternatively, both the expander first lens 22 and the expander second lens 24 may be a concave lens.

Figure 11:
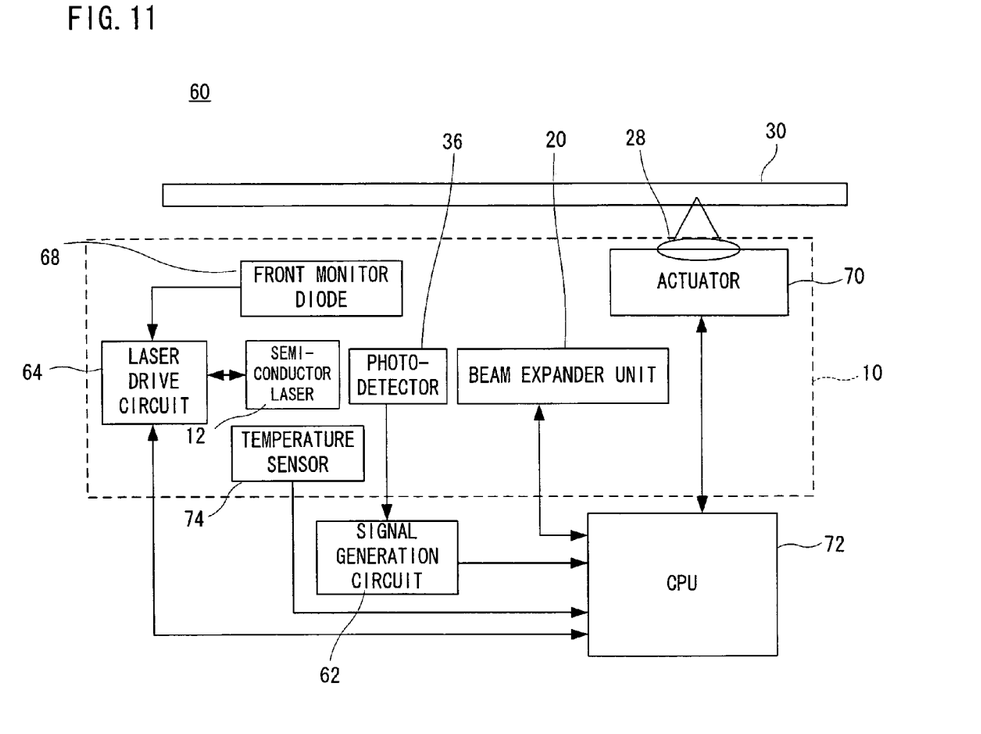
FIG. 11 is a block diagram showing an optical disk recording/reproduction apparatus including the optical pickup device shown in FIG. 1(A).

Next, referring to FIG. 11, a description will be given below as to an optical disk recording/reproduction apparatus 60, such as DVD recorders. The optical disk recording/reproduction apparatus 60 includes the optical pickup device 10, and further comprises a signal generation circuit 62 and a CPU 72.

The optical pickup device 10 includes the semiconductor laser 12, the beam expander unit 20, the object lens 28, the photodetector 36, a laser drive circuit 64, and an object lens actuator 70. The optical pickup device 10 further comprises a temperature sensor 74 for measuring an ambient temperature of the semiconductor laser 12, a front monitor diode 68 for measuring output of the semiconductor laser 12. The temperature and output measured by these components are supplied to the CPU 72.

Also, the signal generation circuit 62 generates a focus error signal, a tracking error signal, an RF signal, etc. based on an output signal from the photodetector 36, and provides the CPU 72 with those generated signals.

When detecting that a laser beam is not focused on the signal recording layer of the optical disk 30 based on the focus error signal, the CPU 72 drives the object lens actuator 70 to move the object lens 28 in the direction of the optical axis, thereby focusing on the signal recording layer. The CPU 72 then calculates the position of the focused object lens 28 along the optical axis, based on a focus drive voltage and a focus voltage sensitivity of the object lens actuator 70. The position of the object lens 28 is here calculated because, if the object lens 28 changes its position, the distance between the object lens 28 and the expander second lens 24 varies as well, which affects the generation of a spherical aberration.

Likewise, when detecting based on the tracking error signal that a laser beam is out of a track of the optical disk 30, the CPU 72 drives the object lens actuator 70 to move the object lens 28 in parallel with the principle surface of the optical disk 30 so that the laser beam is always irradiated onto the track of the optical disk 30.

In addition, the CPU 72 controls the beam expander unit 20 and corrects a spherical aberration, based on the RF signal generated by the signal generation circuit 62, the ambient temperature of the semiconductor laser 12 measured by the temperature sensor 74, the output of the semiconductor laser 12 measured by the front monitor diode 68, and the calculated position of the object lens 28. The ambient temperature and output of the semiconductor laser 12 here are required because, if the wavelength of the laser beam varies with a change in the ambient temperature or output of the semiconductor laser 12, the refractive index of the cover layer of the optical disk 30 corresponding to the wavelength also changes, which leads to an alteration in the virtual film thickness of the cover layer with the occurrence of a spherical aberration. Additionally, the position of the object lens 28 is necessary because, if the object lens 28 is moved along the focus direction to focus on the optical disk 30 when the optical disk 30 is curved, the distance between the object lens 28 and the expander second lens 24 changes accordingly.

The CPU 72 also controls the semiconductor laser drive circuit 64 in order to stabilize the output of the semiconductor laser 12 based on the output value of the semiconductor laser 12 output from the front monitor diode 68, and to generate a strong pulse laser beam required for recoding data on the optical disk 30.

Figure 12:
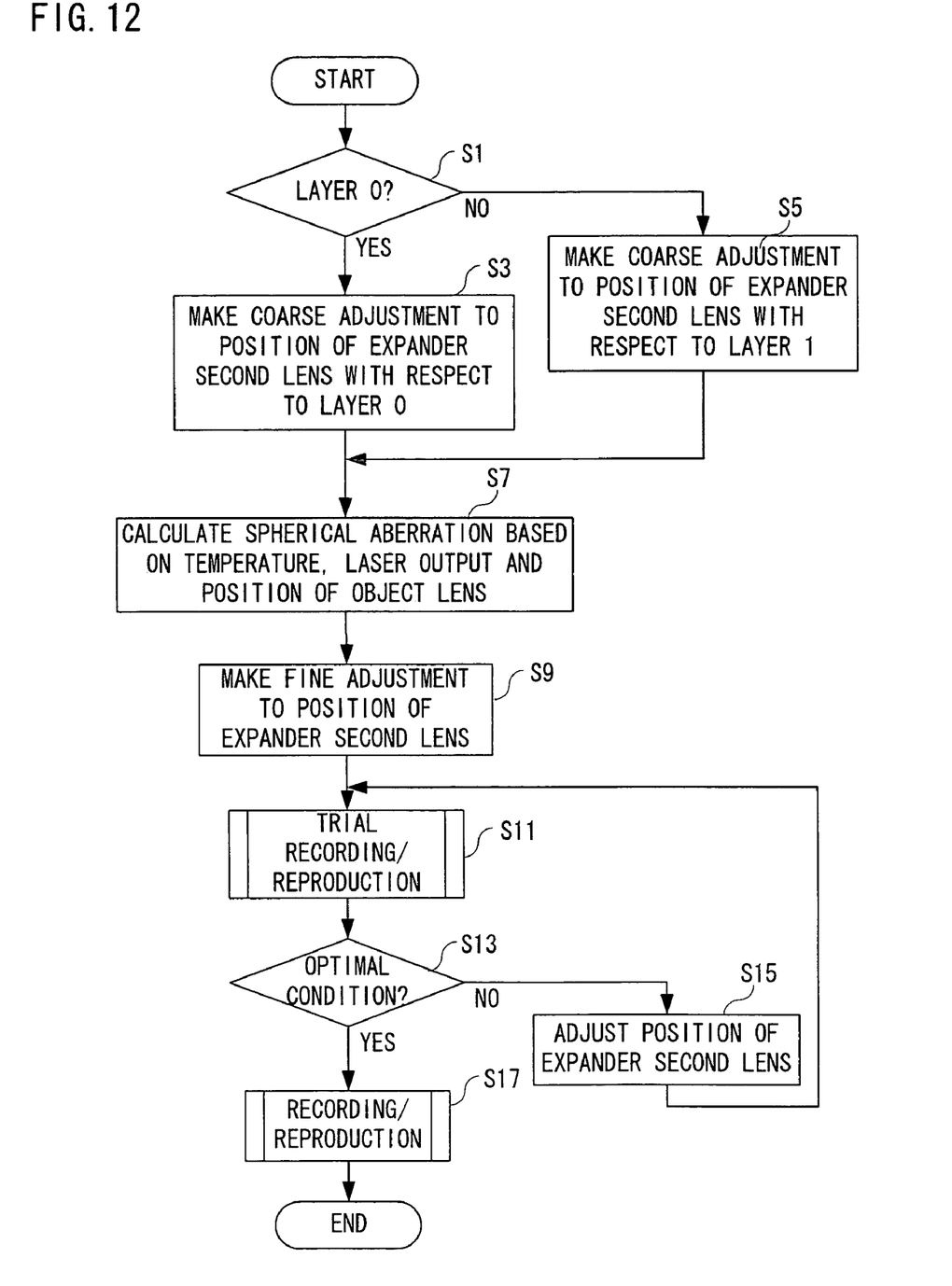
FIG. 12 is a flowchart showing an operation of the optical disk recording/reproduction apparatus shown in FIG. 11.

Next, in reference to FIG. 12, an explanation will be given below regarding a process flow of the CPU 72 for adjusting the position of the beam expander unit 20. Firstly, in a step S1, it is determined whether or not that the signal recording layer for performing data recording/reproduction is a layer 0 as the first signal recording layer 30b of the optical disk 30. If "YES" has been determined, the signal recording layer for performing data recording is the layer 0. In a step S3, therefore, a coarse adjustment is made to the position of the expander second lens 24 in the beam expander unit 20 with respect to the layer 0. On the contrary, if "NO" has been determined, the layer for performing data recording is a layer 1 as the second signal recording layer 30c. In a step S5, therefore, a coarse adjustment is made to the position of the expander second lens 24 with respect to the layer 1. By performing the step S3 or the step S5, the expander second lens 24 can be moved to a tentative position along the optical axis so as to cancel the spherical aberration almost completely.

Next, in a step S7, the resulting spherical aberration is determined on the basis of the ambient temperature of the semiconductor laser 12, the output of the semiconductor laser 12 and the position of the object lens 28. Based on the ambient temperature of the semiconductor laser 12 measured by the temperature sensor 74, a spherical aberration $\Delta X_T$ is calculated by the following equation (1) and equation (2).

$$\Delta \lambda_T = A_T \times \Delta T \tag{1}$$

where $\Delta \lambda_T$: Amount of wavelength change
$\Delta T$: Amount of temperature change
$A_T$: Coefficient varying by the film thickness of the cover layer and the wavelength of laser beam $$\Delta X_T \approx B_T \times \lambda_T = A_T B_T \times \Delta T \tag{2}$$

where $\Delta X_T$: Amount of a spherical aberration
$B_T$: Coefficient varying by the film thickness of the cover layer and the wavelength of laser beam Likewise, a spherical aberration $\Delta X_p$ is calculated by the following equation (3) and equation (4), on the basis of the output of the semiconductor laser 12 measured by the front monitor diode 68.

$$\Delta \lambda_P = A_P \times \Delta P \tag{3}$$

where $\Delta \lambda_p$: Amount of wavelength change
$\Delta P$: Amount of temperature change
$A_p$: Coefficient varying by the film thickness of the cover layer and the wavelength of laser beam $$\Delta X_P \approx B_P \times \lambda_P = A_P B_P \times \Delta P \tag{4}$$

where $\Delta X_p$: Amount of a spherical aberration
$B_p$: Coefficient varying by the film thickness of the cover layer and the wavelength of laser beam Moreover, a spherical aberration $\Delta X_{S1}$ or $\Delta X_{S2}$ is determined by the following equation (5) to equation (9), on the basis of the position of the object lens 28.

$$\alpha = 1/((1/f_{b2}) + (1/(L1 - f_{b1} + \Delta B))) \tag{5}$$

where $f_{b1}$: Focal length of the beam expander first lens 22 (a minus value in the case of the convex lens)
$f_{b2}$: Focal length of the beam expander second lens 24
$\Delta B$: Amount of movement of the collimator lens 18 from the reference position (the position where the laser beam emitted from the collimator lens 18 is collimated). $\Delta B$ on the object lens 28 side is positive.

$$a = L2 - \alpha + \Delta OL \tag{6}$$

where L2: Distance between the object lens 28 and the beam expander second lens 24
$\Delta OL$: Amount of movement of the object lens 28 from the reference position (the position of the object lens 28 where the laser beam is focused on the signal recording layer meets the reference value). $\Delta OL$ on the optical disk 30 side is positive.

$$b = 1/((1/f_{OL}) + (1/a)) \tag{7}$$

where $f_{OL}$: Focal length of the object lens 28

Accordingly, a spherical aberration $\Delta X_{S1}$ in the case where the diffused light is incident on the object lens 28, is determined by the following equation (8).

$$\Delta X_{S1} = C \times (b/a) + E \tag{8}$$

where C: Negative coefficient varying by the film thickness of the cover layer and the wavelength of laser beam
E: Coefficient varying by the film thickness of the cover layer and the wavelength of laser beam Furthermore, a spherical aberration $\Delta X_{S2}$ in the case where the converged light is incident on the object lens, is determined by the following equation (9).

$$\Delta X_{S2} = D \times (b/a) + E \tag{9}$$

where D: Positive coefficient varying by the film thickness of the cover layer and the wavelength of laser beam In a step S9, the expander second lens 24 is further moved by making fine adjustments from the tentative position obtained in the step S3 or step S5 in order to correct the spherical aberration obtained in the step S7. In this way, after the position of the expander second lens 24 has been determined, trial recording/reproduction of the optical disk 30 is performed in a step S11.

In a step S13, it is determined whether the recording/reproduction in the step S11 meets optimal conditions. This determination is made, for example, according to whether or not the reproduced result of data recorded in the step S11 is below a predetermined error rate.

If "NO" has been determined, the position of the expander second lens 24 is shifted a little in a step S15, and the process returns to the step S11.

On the contrary, if "YES" has been determined, recoding/reproduction is performed on the optical disk 30 in a step S17.

Incidentally, in the step S1 of this process flow, it is determined which of the two layers is the signal recording layer. However, the process flow can be also applied to the case where there exists three or more signal recording layers and the case where the cover layer of the optical disk 30 varies in film thickness.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup device for data recording/reproduction on an optical disk with a cover layer formed on a signal recording layer, comprising:
    a light source;
    an object lens for focusing light from said light source onto said signal recording layer through said cover layer;
    a beam expander unit including a fixed portion and a movable portion, provided between said light source and said object lens, for converting light from said light source into any one of diffused light, converged light and collimated light and emits the light; and
    a mover for moving said movable portion in a direction of an optical axis by passing an electrical current through a drive coil contained in said movable portion provided in a magnetic field,
    wherein said beam expander unit further comprises a restorator for restoring said movable portion to a position before having been moved by said drive coil, and
    wherein said restorator includes two spiral leaf springs that are coplanar with arms thereof interleaved and that make no contact with each other, and said two spiral leaf springs are electrically connected with the both ends of said drive coil, respectively.

2. An optical pickup device according to claim 1, wherein said drive coil is wound in a direction orthogonal to said direction of the optical axis, and said magnet is positioned in said fixed portion so that a magnetic field may be generated in a direction orthogonal to both the direction of an electric current passed though said drive coil and the direction of the optical axis.

3. An optical pickup device according to claim 1 or 2, further comprising a collimator lens provided between said light source and said beam expander unit, for converting light from the light source into collimated light.

4. An optical disk recording/reproduction apparatus including an optical pickup device according to claim 1, further comprising:
    a detector for detecting a control factor based on which movement of said movable portion by said mover is to be controlled; and
    a controller for controlling said mover based on said control factor detected by said detector.

5. An optical disk recording/reproduction apparatus including an optical pickup device according to claim 4, wherein said detector includes a temperature sensor for measuring an ambient temperature of said light source as said control factor, and said controller controls said mover based on a result measured by said temperature sensor.

6. An optical disk recording/reproduction apparatus including an optical pickup device according to claim 4, wherein said detector includes an output sensor for measuring output of said light source as said control factor, and said controller controls said mover based on a result measured by said output sensor.

7. An optical disk recording/reproduction apparatus including an optical pickup device according to claim 4, wherein said detector includes a position detector for detecting a position of said object lens along the optical axis as said control factor, and said controller controls said mover based on a result by said position detector.

* * * * *